United States Patent [19]
Portz

[11] 4,093,031
[45] June 6, 1978

[54] PENDULUM TYPE HOE

[75] Inventor: William E. Portz, North Madison, Ohio

[73] Assignee: True Temper Corporation, Cleveland, Ohio

[21] Appl. No.: 809,901

[22] Filed: Jun. 24, 1977

[51] Int. Cl.² .......................... A01B 1/10; A01B 1/22
[52] U.S. Cl. ..................................... 172/372; 172/376
[58] Field of Search ............... 172/372, 373, 374, 376, 172/377

[56] References Cited

U.S. PATENT DOCUMENTS

| | | | |
|---|---|---|---|
| 1,224,630 | 5/1917 | Gilson, Sr. | 172/372 |
| 2,539,351 | 1/1951 | Gress | 172/372 |
| 2,943,690 | 7/1960 | Towt | 172/376 |
| 2,988,157 | 6/1961 | Lindstaedt | 172/376 |
| 3,965,991 | 6/1976 | Eads et al. | 172/376 |

FOREIGN PATENT DOCUMENTS 606,411 12/1934 Germany ............................ 172/372

*Primary Examiner*—Richard T. Stouffer
*Attorney, Agent, or Firm*—J. H. Slough

[57] ABSTRACT

A pendulum type hoe has a stirrup-shaped blade mounted to the fork of a handle for limited articulation. Inturned flanges of the blade engage hourglass shaped openings in the fork arms, the flanges being retained between reinforcing bars which project through the openings and afford strength, wear resistance, and limited resilience to the blade. The fork is made in two separable parts whereby any component of the hoe may be replaced.

14 Claims, 9 Drawing Figures

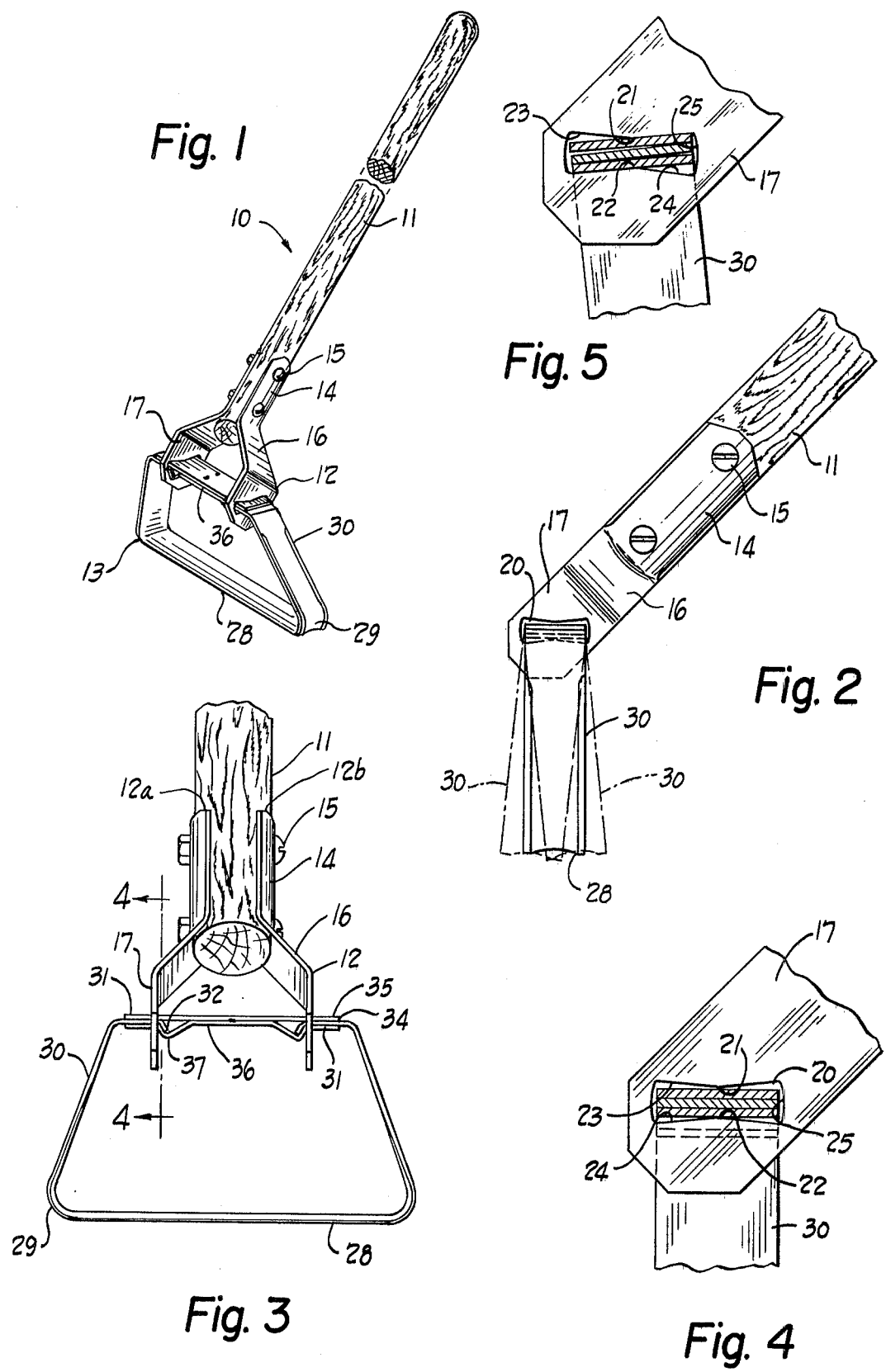

PENDULUM TYPE HOE

This invention relates to a hand tool for garden cultivation and relates more particularly to improvement in a cultivating tool or hoe having a pendulum action. Hand tools of the so-called pendulum type herein referred to are well-known and provide, in general, a depending, U-shaped blade mounted for limited articulation at the upper end of the U to an elongated handle. The bottom, usually horizontal portion of the U is moved forwardly and backwardly through the ground for removal of weeds and general cultivation, the blade tilting alternately forwardly and rearwardly a limited amount with each stroke. Thus the blade adjusts itself to the proper angle of penetration of the ground with either the forward or rearward stroke of the tool. The arrangement also provides a certain amount of lost motion between the handle and the blade whereby at each reversal of the stroke the blade is suddenly jerked into motion upon reaching the limit of articulation. This effect aids in dislodging particularly stubborn weeds and in cultivating heavily impacted soil. Certain prior constructions of this type of hand tool are shown in various U.S. Pat. Nos.; namely, 2,539,531 issued to E. L. Gress Jan. 23, 1951; 2,943,690 issued to D. G. Towt July 5, 1960; 2,988,157 issued to F. F. Lindstaedt June 13, 1961; and 3,965,991 issued to H. O. Eads et al. June 29, 1976. In all of these patents, the manual tool comprises a handle, a U-shaped blade, the blade being secured by fork means to the handle and having limited rocking movement.

The present invention is particularly directed to an improvement over the tool shown in Gress. In that patent a blade is formed from flat sheet steel strip and is provided with a pair or right-angular, upwardly bent arms the upper ends of which have inwardly turned flanges. The flanges project toward each other and through slots in laterally spaced arms of a fork mounted at one end of an elongated handle. Each slot is in the form of a pair of congruent triangles with the midpoint of the slot providing opposing fulcrum points. Thus the flanges and blade have a limited rocking motion about the fulcrum points and within the oppositely diverging triangular portions of the slot.

In constructing the U-shaped blade, it is perferable to keep the metal as thin as possible to lighten the weight of the tool and enhance its penetrating or slicing action through the soil. However, the thin-gage flanges are subject to excessive wear and distortion as the blade is repeatedly rocked back and forth in the slots and subjected to substantial pressures by the user. In the present invention as herein disclosed, hourglass shaped slots are enlarged and the inturned flanges of the blade are sandwiched between bifurcated end portions of a reinforcing member which comprises upper and lower reinforcing bars. Inner end portions of the blade flanges are angularly bent, and the lower reinforcing bar is shaped to receive these bends, the protuberances caused thereby serving to prevent lateral shifting of the blade. The reinforcing bars are preferably secured to each other at an intermediate area between the inturned flanges of the blade and provide a resilient, mechanical engagement of the flanges.

It is an object of the present invention to provide a tool of the type described which provides improved pivot means allowing the cutting blade to swing forwardly and rearwardly.

Another object of the invention is to provide the above tool wherein additional reinforcement and wear resistance is provided in the areas of articulation.

Still another object of the invention is to provide a hand tool having the above features and characteristics wherein there is provided improved means for laterally stabilizing the blade to prevent shifting thereof.

A still further object of the invention is to provide a cultivating hand tool as set forth above wherein the inturned flanges of the blade are resiliently retained thereby providing a limited flexing action of the blade for softening the shock when substantial resistance is met in use of the tool.

An additional object of the invention is to provide a tool as set forth above which can be completely disassembled for the purpose of replacing any component part thereof.

Yet another object of the invention is to provide such a tool which is simple and strudy in construction and highly durable in use.

Other objects of the invention and the invention itself will become more readily apparent by reference to the accompanying drawings in all of which like parts are designated by like reference numerals. In the drawings:

FIG. 1 is a perspective view of the cultivating hand tool of this invention, part of the elongated handle thereof being cut away;

FIG. 2 is an enlarged side elevation of the lower end, working portion of the tool;

FIG. 3 is a front elevation of the tool drawn to the scale of FIG. 2;

FIG. 4 is an enlarged vertical section taken along the line 4—4 of FIG. 3;

FIG. 5 is a section similar to FIG. 4 showing the blade in one tilted position;

Figure 6:
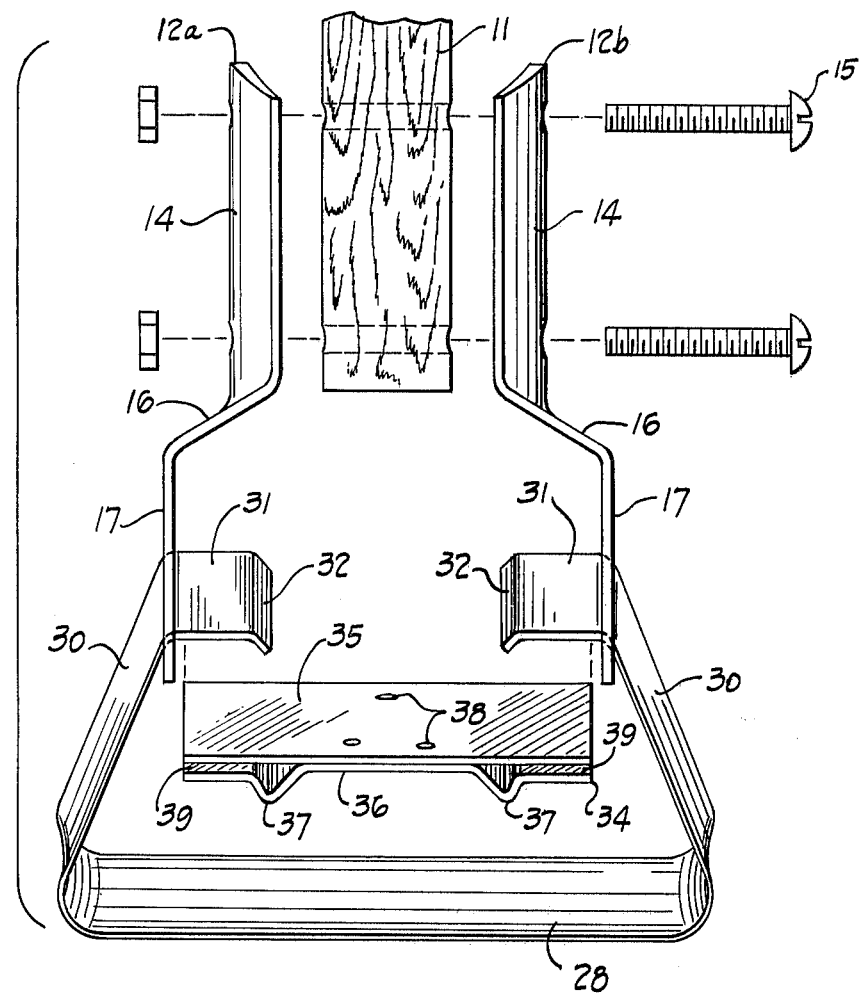
FIG. 6 is an enlarged, front exploded view illustrating the manner in which the cultivating hand tool of this invention can be completely disassembled.

Referring now to the drawings in all of which like parts are designated by like reference numerals, the cultivating tool of this invention as herein disclosed is generally indicated by the reference numeral 10 in FIG. 1. Said tool comprises an elongated, preferably cylindrical handle 11, a lowermost fork 12, and a stirrup-shaped pendulum blade 13. The fork is divided into a pair of mirror image fork sections 12a and 12b. Each fork section is formed from substantially heavy-gage sheet metal and comprises a curved shank 14, an outwardly and downwardly angled portion 16, and a leg portion 17 disposed parallel with the axis of the handle 11. The shanks 14 are secured to opposite sides of the handle by means of bolt and nut assemblies 15 and the leg portions 17 are parallel and spaced a substantial distance apart.

Referring particularly to FIG. 4, the lower end portion of each leg portion 17 is provided with an hourglass shaped slot or opening 20 which is disposed generally horizontally when the handle 11 is held at a normal working angle. The slot 20 has its narrowest dimension disposed midway between the ends of the slot to provide a pair of upper and lower fulcrum points 21 and 22, respectively. Upper and lower edge portions 23 and 24, respectively, diverge in either direction away from said fulcrum points and terminate in preferably slightly rounded end edges 25.

The blade 13 comprises a horizontal base 28 which provides the main cultivating portion thereof. Said blade is preferably formed of substantially thin sheet metal and includes integral curved end portions 29 and integral, upwardly converging arms 30. Curved end portions 29 and portions of the arms 30 also provide cultivating means when the blade makes substantial penetration of the soil. The upper ends of said arms are bent inwardly at points spaced outwardly from the fork leg portions 17 and have inwardly directed flanges 31 which project inwardly through the slots 20 and slightly beyond said leg portions. The innermost end portions of the flanges 31, indicated at 32, are bent downwardly at approximately a 45° angle closely adjacent to the inner surfaces of the leg portions 17.

As shown particularly in FIG. 4, each hourglass shaped slot 20 is sufficiently wide even at its narrowest point between the fulcrums 21 and 22 to accommodate more than just the thickness of the blade flanges 31. Said slots also receive bifurcated end portions of a reinforcing member 34. The reinforcing member comprises an upper reinforcing bar 35 and a lower reinforcing bar 36 disposed through the slots 20 with end portions thereof extending outwardly of the leg portions 17 and overlapping the upper and lower surfaces, respectively, of the flanges 31. The lower reinforcing bar 36 has a medial portion disposed flatwise against the bottom of the upper reinforcing bar 35 and is provided with V-shaped offsets of bends 37 which are adapted to receive and accommodate the bent ends 32 of the blade flanges 31 and provide protuberances which are too large to enter said slots 20 and, therefore, prevent lateral shifting of the blade. Medial portions of the reinforcing bars 35 and 36 are secured together by suitable means such as tack welds indicated at 38.

Figure 7:
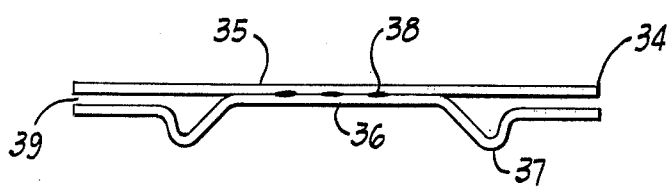
FIG. 7 is a front edge elevation of a reinforcing member drawn to a slightly larger scale than FIG. 6.
Figure 8:
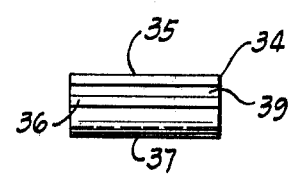
FIG. 8 is an end view of the member of FIG. 7 as seen from either end thereof.
Figure 9:
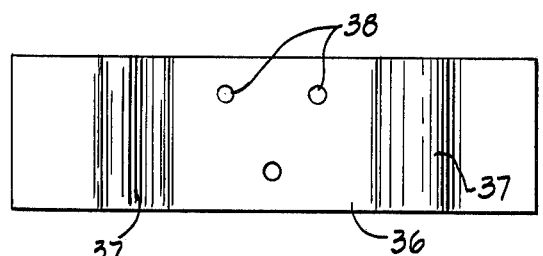
FIG. 9 is a top plan view of the member of FIGS. 7 and 8.

The laterally outwardly directed ends of said bars 35 and 36 are spaced apart vertically to provide an opening 39, as clearly shown in FIG. 7, whereby to mechanically engage the inturned flanges 31 an afford some shock absorbent flexibility when the blade 13 is rocked or pivoted in use. FIG. 2 of the drawings shows, in phantom line, the general extent of articulation possible by the pendulum blade 13. It will be readily understood that the diverging wall portions 23 and 24 of the hourglass shaped slot 21 allow the flanges 31 and the reinforcing bars 35 and 36 to rock a limited amount. It will also be noted that the vertical distance between the fulcrum points 21 and 22 is slightly greater than even the combined thickness of the flange and reinforcing bars. Thus if extreme or sudden pressure is placed upon the blade in either the forward or rearward direction, the ends of the reinforcing bars can flex apart slightly, as shown in FIG. 5, to absorb part of the shock.

Although made of substantially thin sheet metal, the blade 13 must be sufficiently stiff to cut through heavy impacted soil without collapsing. For added strength, the blade is preferably slightly convexly rounded inwardly in cross section in a known manner. The flanges 31 are flat in section but are more than adequately reinforced and protected from wear by the reinforcing bars 35 and 36.

FIG. 6 illustrates the manner in which the cultivating tool of the present invention can be completely disassembled whereby any separate component thereof can be replaced. As clearly described in the foregoing description and shown in the accompanying drawings, the fork 12 comprises separate sections 12a and 12b each having a curved shank 14 adapted to engage the handle 11, an outwardly and downwardly angled portion 16, and a leg portion 17 disposed parallel with the axis of the handle 11. Thus when the bolt and nut assemblies 15 are disassembled, each half of the fork 12 can be moved laterally with respect to the flanges 31 until it is disposed outwardly beyond the bifurcated ends of the reinforcing member 34. This allows said reinforcing member to be moved or slid off of the flanges 31 in either the forward or rearward direction. FIG. 6 shows the reinforcing member 34 moved forwardly of and completely disengaged from said flanges. The openings 39 between the end portions of the bars 35 and 36 are preferably of such dimension as to provide an easily slidable fit between the reinforcing member 34 and the inturned flanges 31.

Once the reinforcing member 34 is removed, it will be readily seen that the fork sections 12a and 12b can be moved inwardly whereby the associated flanges 31 are completely disengaged from the hourglass shaped slots 20. Thus any worn or damaged component of the hoe can be readily removed and replaced. Additionally, the present construction greatly facilitates the initial assembly of the tool at the factory. Component parts of the hoe can be quickly and easily assembled into a finished product by reversing the steps set forth above for disassembly.

From the foregoing it will be readily understood that the present invention provides a pendulum cultivating tool which is lightweight and easy to handle, is self-adjusting to the right angle for penetration as it is moved forwardly and backwardly through the soil, has adequate reinforcing and wearresistant means at the point of articulation, is provided with built-in shock absorbing means for protection of the tool and the comfort and reduction of fatigue of the user, and is readily disassembled for the purpose of replacing worn or damaged parts.

It will also be understood that many changes in the details of the invention as herein described and illustrated may be made without, however, departing from the spirit thereof or the scope of the appended claims. I claim:

1. A pendulum type hoe comprising a handle;
   a fork secured to one end of said handle and comprising a pair of laterally spaced, parallel leg portions extending beyond said one end;
   said leg portions having elongated slots therein disposed at an angle relative to said leg portions whereby the longer axes of said slots are generally horizontal when said handle is disposed at a normal working angle;
   a blade having a pair of upwardly angled arms;
   the upper ends of said arms having inwardly turned flanges projecting inwardly through said slots toward each other;
   a reinforcing member having bifurcated end portions projecting through said slots and affording laterally directed openings receiving said flanges;
   said flanges and said bifurcated end portions having a combined thickness smaller than the vertical width of said slots whereby to allow limited articulation of said blade with respect to said fork.

2. A pendulum type hoe as set forth in claim 1 wherein said bifurcated end portions of said reinforcing member have means providing protuberances abutting said leg portions and retaining said reinforcing member and said flanges against lateral displacement.

3. A pendulum type hoe comprising a handle;
a fork secured to one end of said handle and comprising a pair of laterally spaced, parallel leg portions extending beyond said one end;
said leg portions having elongated slots therein disposed at an angle relative to said leg portions whereby the longer axes of said slots are generally horizontal when said handle is disposed at a normal working angle;
a blade having a pair of upwardly angled arms;
the upper ends of said arms having inwardly turned flanges projecting inwardly through said slots toward each other;
upper and lower reinforcing bars having end portions projecting through said slots, said flanges being sandwiched between said end portions of said bars, said end portions and flanges having a combined thickness smaller than the vertical width of said slots whereby to allow limited articulation of said blade with respect to said fork;
means securing said bars to each other.

4. A pendulum type hoe as set forth in claim 3 wherein said securing means connects medial portions only of said bars to each other.

5. A pendulum type hoe as set forth in claim 4 wherein end portions of said flanges are angularly bent adjacent to the inner surfaces of said parallel leg portions;
one of said reinforcing bars having offset portions disposed over said bent end portions whereby said flanges and reinforcing bars are retained against endwise displacement relative to said leg portions.

6. A pendulum type hoe as set forth in claim 4 wherein end portions of said flanges are angularly bent downwardly adjacent to the inner surfaces of said parallel leg portions;
said lower reinforcing bar having offset portions disposed over said bent end portions whereby said flanges and reinforcing bars are retained against endwise displacement relative to said leg portions.

7. A pendulum type hoe for cultivating soil comprising an elongated handle;
a fork secured to one end of said handle and comprising a pair of laterally spaced, parallel leg portions extending beyond said one end;
said leg portions having elongated slots therein disposed at an angle relative to said leg portions whereby the longer axes of said slots are generally horizontal when said handle is disposed at a normal working angle;
said slots being hourglass shaped and having upper and lower edge portions diverging in either longitudinal direction from relatively narrow middle portions of said slots;
a blade having a pair of upwardly angled arms;
the upper ends of said arms having inwardly turned flanges projecting inwardly through said slots toward each other;
upper and lower reinforcing bars having end portions projecting through said slots;
means securing said bars to each other, said flanges being disposed between said end portions of said bars, and said end portions and flanges being movable in a rocking motion within said divergent slot portions about a fulcrum afforded by said narrow middle portion whereby to provide limited back and forth tilting of said blade with respect to said fork during cultivation.

8. A pendulum type hoe as set forth in claim 7 wherein said securing means connects medial portions only of said bars to each other intermediate said end portions, and said flanges are disposed between said end portions.

9. A pendulum type hoe as set forth in claim 8 wherein end portions of said flanges are angularly bent adjacent to the inner surfaces of said parallel leg portions;
one of said reinforcing bars having offset portions disposed over said bent end portions and providing protuberances larger than said slots whereby said flanges and reinforcing bars are retained against endwise displacement by said leg portions.

10. A pendulum type hoe as set forth in claim 8 wherein end portions of said flanges are angularly bent downwardly adjacent to the inner surfaces of said parallel leg portions;
said lower reinforcing bar having offset portions disposed over said bent end portions and providing protuberances larger than said slots whereby said flanges and reinforcing bars are retained against endwise displacement relative to said leg portions.

11. A pendulum type hoe as set forth in claim 7 wherein said reinforcing bars have sufficient flexibility to allow said end portions to separate in response to pressure on said blade in a tilted position during cultivation;
said bar end portions and said flanges having a combined thickness smaller than the vertical dimension of said slot at said narrow middle portion whereby said end portions of said bars can flex apart to absorb part of the shock of the back and forth articulation of the blade.

12. A pendulum type hoe as set forth in claim 7 wherein said reinforcing bars are made of metal and said means securing said bars to each other comprise tack welding of medial portions only of said bars to each other intermediate said end portions.

13. A pendulum type hoe for cultivating soil comprising an elongated handle;
a fork secured to one end of said handle and comprising a pair of complementary fork sections, said sections being disposed on either side of one end portion of said handle and each providing one of a pair of laterally spaced, parallel leg portions extending beyond said one end portion of said handle;
means detachably connecting said fork sections to said handle and each other;
said leg portions having elongated slots therein disposed at an angle relative to said leg portions whereby the longer axes of said slots are generally horizontal when said handle is disposed at a normal working angle;
a blade having a pair of upwardly angled arms;
the upper ends of said arms having inwardly turned flanges projecting inwardly through said slots toward each other;
a reinforcing member having bifurcated end portions projecting through said slots and affording laterally directed openings receiving said flanges;
end portions of said flanges being angularly bent adjacent to the inner surfaces of said parallel leg portions;
said bifurcated end portions having offset portions disposed over said bent flange end portions and providing protuberances larger than said slots whereby said flanges and reinforcing member are retained against lateral displacement by said offset portions abutting the inner surfaces of said leg portions, said reinforcing member being slidable with respect to said flanges in the direction of the longer axes of said slots and retained against such sliding movement by projecting through said slots; said hoe adapted to be disassembled by detaching said fork sections from said handle and each other, moving each fork section laterally outwardly until its arm portion is disposed beyond the adjacent bifurcated end portion of the reinforcing member, sliding said reinforcing member in the direction of the longer axes of said slots and removing it from said flanges, and moving each said fork section laterally inwardly off the end of the associated flange.

14. A pendulum type hoe as set forth in claim 12 wherein said reinforcing member comprises upper and lower reinforcing bars having end portions projecting through said slots;

means securing medial portions only of said bars to each other, end portions of said bars being spaced apart to provide said bifurcated end portions and one of said bars being bent around said angled end portions of said flanges to provide said offset portions.

* * * * *